United States Patent [19]

Kamimura et al.

[11] Patent Number: 5,427,660
[45] Date of Patent: Jun. 27, 1995

[54] SINTERED COMPOSITE AND METHOD OF MANUFACTURE

[75] Inventors: Tadashi Kamimura, Yokohama; Akira Tsujimura, Chigasaki, both of Japan

[73] Assignee: Isuzu Motors, Ltd., Tokyo, Japan

[21] Appl. No.: 225,093

[22] Filed: Apr. 8, 1994

Related U.S. Application Data

[63] Continuation of Ser. No. 671,545, Mar. 19, 1991, abandoned.

[30] Foreign Application Priority Data

Mar. 19, 1990 [JP] Japan ................... 2-069018

[51] Int. Cl.$^6$ ............................................. B22F 1/00
[52] U.S. Cl. ............................ 204/130; 419/52; 427/213.3; 427/222
[58] Field of Search ............... 419/52; 427/213.3, 222; 204/130

[56] References Cited

U.S. PATENT DOCUMENTS

| | | | |
|---|---|---|---|
| 3,331,686 | 7/1967 | Bonis et al. | 419/52 |
| 3,755,213 | 8/1973 | Kendall et al. | 260/2.5 EP |
| 4,443,404 | 4/1984 | Tsuda et al. | 419/52 |
| 4,915,987 | 4/1990 | Nara et al. | 427/180 |
| 4,929,415 | 5/1990 | Okazaki | 419/52 |
| 4,944,817 | 7/1990 | Bourell et al. | 156/62.2 |

FOREIGN PATENT DOCUMENTS

| | | |
|---|---|---|
| 224659A | 6/1987 | European Pat. Off. . |
| 0224659 | 6/1987 | European Pat. Off. . |
| 2448738 | 4/1976 | Germany . |
| 2755855 | 7/1978 | Germany . |
| 3316650 | 11/1983 | Germany . |
| 293508 | 12/1953 | Switzerland . |
| 1142990 | 2/1969 | United Kingdom . |

OTHER PUBLICATIONS

*Patent Abstracts of Japan*, vol. 13, No. 369 (M-860)[3717], Aug. 16, 1989 (JP 1 123 008).
*Patent Abstracts of Japan*, vol. 13, No. 494 (C-651[3842], Nov. 8, 1989 (JP 1 197 369).
*Patent Abstracts of Japan*, vol. 4, No. 92 (M-18)[574], Jul. 3, 1980 (JP 55 50 402).

*Primary Examiner*—John Niebling
*Assistant Examiner*—Arun S. Phasge
*Attorney, Agent, or Firm*—Staas & Halsey

[57] ABSTRACT

A sintered composite comprises capsule-like powder composite particles composed of core particles and an electrically conductive covering material which covers said core particles. The capsule-like powder composite particles are sintered in a sintering mold while pulsed voltages are being applied to the powder composite particles.

13 Claims, 1 Drawing Sheet

HIGH  LOW

SINTERED COMPOSITE AND METHOD OF MANUFACTURE

This application is a continuation of U.S. patent application Ser. No. 07/671,545, filed Mar. 19, 1991, now abandoned.

BACKGROUND OF THE INVENTION

The present invention relates to a sintered composite composed of sintered powders of different materials and a method of manufacturing such a sintered composite.

It has long been practiced to heat metal powder or nonmetal powder into a sintered product. It is also customary in various fields of art to sinter powders of different materials into sintered composites having improved heat resistance, abrasion resistance, rigidity, and sliding capability.

For example, aluminum powder and aluminum alloy powder or copper powder and copper alloy powder are mixed and sintered into a sintered composite for use as a sliding component material such as a bearing material. It is however difficult to mix such different powders uniformly and hence to make a uniform composite material from the powders. If powder of a softer material such as lead or tin is mixed when iron-base metal powder is sintered into a sliding component such as a bearing, then the produced sliding component has an improved sliding ability because its sliding surface can well slide against other objects. However, the softer material such as lead or tin cannot easily be dispersed uniformly in the iron-base metal powder. In addition, since the melting points of lead and tin are lower than the melting point of iron, if the powder mixture were sintered at a sintering temperature for iron, e.g., 1000° C., in an inert gas atmosphere or a reducing atmosphere according to the normal sintering process, then lead or tin would completely be melted and flow downwardly.

There has been developed a metallic material which has a repulsive capability like a rubber ball. However, any metallic material which is viscoelastic at normal temperature, like rubber, is not available yet. If such a viscoelastic metallic material were developed, it would be soldered or spot-welded to an existing metallic material, and would find a wide variety of applications. Therefore, demands for the material are growing in the art.

A sintered composite of synthetic resin and metal would be lightweight and highly rigid, could be formed easily into desired shapes, and would be of high machinability. There is also a strong demand for such a sintered composite.

SUMMARY OF THE INVENTION

It is an object of the present invention to provide a sintered composite composed of a plurality of different materials which are uniformly distributed in the sintered composite.

Another object of the present invention is to provide a sintered composite composed of a plurality of different materials which have different melting points and are uniformly distributed in the sintered composite.

Still another object of the present invention is to provide a method of manufacturing such a sintered composite with ease.

According to the present invention, there is provided a method of manufacturing a sintered composite of a plurality of different materials, comprising the steps of producing capsule-like powder composite particles composed of core particles and an electrically conductive covering material which covers the core particles, filling the capsule-like powder composite particles in a sintering mold, and applying pulsed voltages to the capsule-like powder composite particles in the sintering mold, for thereby producing a sintered composite.

According to the present invention, there is also provided a sintered composite comprising a solid mass of capsule-like powder composite particles composed of core particles and en electrically conductive covering material which covers the core particles, the electrically conductive covering material having a melting point higher than the melting point of the core particles.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
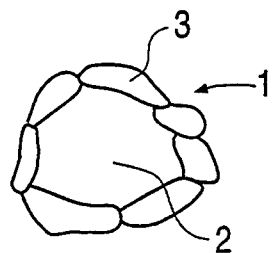
FIG. 1 is a schematic diagram showing a powder composite to be sintered into a sintered composite according to the present invention.

As shown in FIG. 1, a capsule-like powder composite particle 1 which is to be sintered into a sintered composite comprises a core particle 2 and a plurality of particles 3 covering the surface of the core particle 2. The core particle 2 may be of a metal or nonmetal material, as will be described later in examples. The covering particles 3 are made of an electrically conductive material. The powder composite particle 1 may be produced as follows: The covering particles 3 are adhered to the surface of the core particle 2 under electrostatic forces when mixed with the core particle 2. Then, the mixture is placed into a housing having rotary vanes, and rotated under centrifugal forces by the rotary vanes until the covering particles 3 are firmly attached to the surface of the core particle 2 through mechanical bonding. Such a process of producing the powder composite particle 1 is disclosed in Japanese Laid-Open Patent Publication No. 62(1987)-250942, for example.

Figure 2:
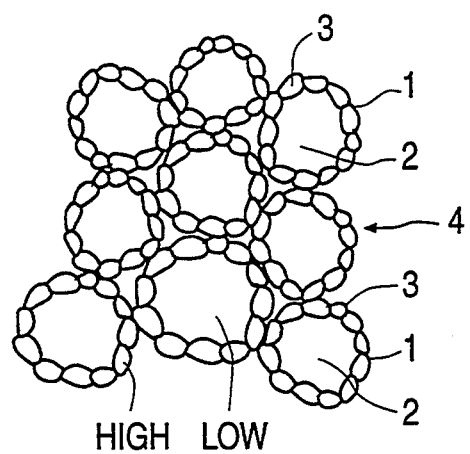
FIG. 2 is a schematic diagram showing a cluster of powder composites.

FIG. 2 shows a solid mass or cluster 4 of capsule-like powder composite particles 1 which are sintered. The core particles 2 each covered with the covering particles 3 are securely coupled together into a unitary structure by the covering particles 3 that are bonded to each other. The cluster 4 thus formed serves as a sintered composite according to the present invention.

Figure 3:
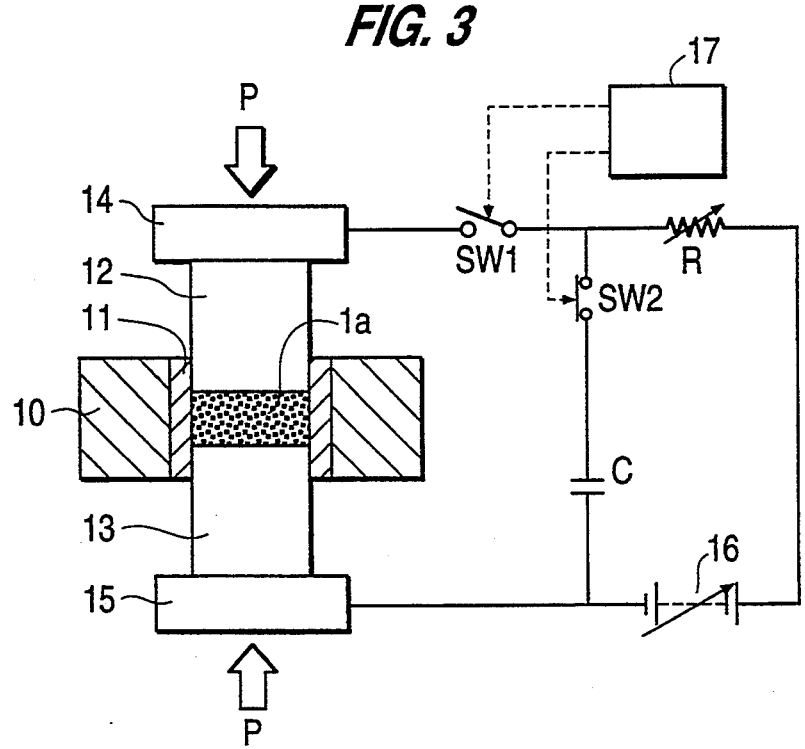
FIG. 3 is a circuit diagram of an apparatus for manufacturing the sintered composite.

A sintering apparatus for producing such a sintered component according to the present invention is shown in FIG. 3. The sintering apparatus includes a sintering mold 10 which is made of a highly strong metal such as tungsten steel, and has a central hole for placing a mass of powder 1a, i.e., the cluster 4 of capsule-like powder composite particles 1, to be sintered. The inner wall of the hole is coated with an insulating layer 11.

Upper and lower plungers 12, 13 have lower and upper ends, respectively, inserted in the hole in the sintering mold 10. The mass of powder 1a is placed in the hole 1a between the upper and lower plungers 12, 13 and processed into a sintered composite.

The upper and lower plungers 12, 13 are connected respectively to upper and lower electrodes 14, 15. The upper and lower plungers 12, 13 and the upper and lower electrodes 14, 15 are controllably pressed by a hydraulic press in the directions indicated by the arrows F so that the powder in the sintering mold 10 is pressed, while a voltage is being applied thereto by the electrodes 14, 15.

The upper and lower electrodes 14, 15 are electrically connected to a series-connected circuit of switches SW1, SW2 and a capacitor C, and a series-connected circuit of a variable resistor R and a variable-voltage power supply 16 is connected parallel to a series-connected circuit of the capacitor C and the switch SW2. The switches SW1, SW2 are controlled by a controller 17. An electric current is supplied under a high voltage from the variable-voltage power supply 16 to charge the capacitor C through the resistor 6 and the switch SW2 which is closed. When the switch SW1 is closed, a high voltage is applied through the electrodes 14, 15 and the upper and lower plungers 12, 13 to the pressed powder to cause an electric discharge therein. Repeated application of the high voltage to the pressed powder breaks oxides and other impurities on the surfaces of the covering particles 3, and hence purifies the surfaces of the covering particles 3, thus allowing the covering particles 3 to be fused together.

A first example of a sintered composite will be described below.

The core particles 2 are in the form of lead or tin powder particles having a low melting point, and the covering particles 3 are in the form of iron powder particles having a diameter smaller than that of the core particles 2. The covering particles 3 are attached to the surfaces core particles 2, thus producing capsule-like powder composite particles 1a. The powder composite particles 1a are then filled in the hole of the sintering mold 10 with the lower plunger 13 inserted therein. Then, the powder composite particles 1a are pressed by the upper plunger 12.

The switches SW1, SW2 are controlled by the controller 17 to apply pulsed voltages to the powder composite particles 1a through the electrodes 14, 15 and the plungers 12, 13 while the powder composite particles 1a are being pressed.

An electric discharge is caused between the covering particles 3 of iron of the powder composite particles 1a. The electric discharge is repeated to purify the surfaces of the covering particles 3 and heat the covering particles 3 until the covering particles 3 of iron are fused and joined together. The core particles 2 of lead or tin are covered with the iron powder particles, resulting in a sintered cluster 4 of capsule-like powder composite particles 1, as shown in FIG. 2.

The covering particles 3 may comprise copper or aluminum powder particles, and the core particles 2 may be of any of various other metals, provided sintering conditions should be suitably selected. The sintered composite of such alternative materials may be used as a sliding component material such as a bearing material, or a material with improved heat resistance which is greater than the heat resistance of aluminum itself.

Since capsule-like powder composite particles composed of core particles covered with electrically conductive covering particles are sintered in the sintering mold under the application of pulsed voltages, a sintered composite with component materials uniformly distributed can be produced. Because the surfaces of the covering particles are purified and heated to join the covering particles, the capsule-like powder composite particles are bonded together without adversely affecting the core particles. Therefore, a sintered component composed of materials having different melting points can be produced. Particularly, there can be produced a sintered composite of capsule-like powder composite particles which comprise core particles of a low-melting-point material and covering particles of a high-melting-point material.

Furthermore, inasmuch as the core particles are covered with the covering particles in the form of powder particles, a gas which is generated when the powder composite particles are sintered can easily be removed through the interstices between the covering particles. Accordingly, the sintered composite is prevented from trapping gas bubbles therein.

A second example of a sintered composite will be described below. In the second example, core particles are of a nonmetal, electrically nonconductive material.

The core particles 2 are in the form of rubber particles having a diameter ranging from 20 to 500$\mu$, and the covering particles 3 are in the form of electrically conductive metal powder particles such as of copper.

The core particles 2 of rubber may be produced by mixing about 6% of sulfur with raw rubber, vulcanizing the mixture into soft rubber, and processing the soft rubber into particles having a diameter ranging from 20 to 500$\mu$ or mass particles. The covering particles 3 of copper have a diameter which is about one-tenth of the diameter of the rubber particles. About 30% by weight of the covering particles 3 are mixed with the core particles 2, and the covering particles 3 are attached to the surfaces of the core particles 2 under electrostatic forces, thus providing capsule-like powder composite particles 1a.

The capsule-like powder composite particles 1a are then placed in a housing having rotary vanes which are rotatable at a speed ranging from 2000 to 7000 rpm, and rotated under centrifugal forces, so that the copper particles are firmly adhered to the surfaces of the rubber particles.

The capsule-like powder composite particles 1a are put in the sintering mold 10 of the sintering apparatus shown in FIG. 3, and pressed under the application of pulsed voltages. An electric discharge is repeated produced between the covering particles of copper, which are then heated and joined together without adversely affecting the core particles of rubber, thereby producing a sintered composite.

The covering particles 3 may be of any of various electrically conductive material such as aluminum, iron, nickel, chromium, or the like. Furthermore, since the internal temperature of the core particles 3 is not appreciably increased, the core particles 3 may be of ebonite with an increased sulfur content, natural rubber, styrene rubber, nytril rubber, fluororubber, or the like depending on the application of the sintered composite.

By varying the materials of the core particles and the covering particles, the modulus of elasticity of the sintered composite may be freely varied. Because the covering particles 3 are of metal, the sintered composite may be soldered or spot-welded, or plated to achieve desired surface color and property.

A third example of a sintered composite will be described below.

In the third example, the core particles 2 are in the form of synthetic resin powder particles, and the covering particles 3 are in the form of electrically conductive metal particles. The core particles 2 may be of polycarbonate, polypropylene, polyethylene, or polyacetate depending on the application of the sintered composite.

The synthetic resin powder particles as the core particles 2 have a diameter ranging from 10 to 200μ. The covering particles 3 of metal such as copper or aluminum have a diameter which is about one-tenth of the diameter of the core particles 2. The core particles 2 and the covering particles 3 are mixed together, and either are adhered to each other under electrostatic forces and then rotated under centrifugal forces, or are adhered to each other by a spraying process and then rotated until the covering particles 3 are firmly coated on the core particles 2. In this manner, capsule-like power composite particles 1a with the core particles of synthetic resin are produced.

Thereafter, the capsule-like powder composite particles 1a are sintered by the sintering apparatus shown in FIG. 3 by pulsed currents under pulsed voltages. Since no electric current flows through the core particles 2, their temperature does not rise appreciably, but only the covering particles 3 of metal are heated and joined together, thereby producing a sintered composite.

Since the surface of the sintered composite thus produced is coated with metal, the machinability of the sintered composite is analogous to metals, and the sintered composite can be machined just like metals.

With the present invention, as described above, capsule-like powder composite particles composed of core particles covered with electrically conductive covering particles are sintered in the sintering mold under the application of pulsed voltages. Thus, a sintered composite with component materials uniformly distributed can be produced. A sintered component composed of materials having different melting points can be produced with a uniform distribution of component materials. Particularly, there can be produced a sintered composite of capsule-like powder composite particles which comprise core particles having a lower melting point than that of covering particles.

Moreover, since capsule-like powder composite particles are sintered under the application of pulsed voltages in the sintering mold, insofar as the covering particles are of an electrically conductive material such as metal, carbon, or the like, the core particles may be of an electrically nonconductive material such as rubber, synthetic resin, or the like. Sintered composites of such materials provide various desirable properties suitable for a wide variety of applications.

Although a certain preferred embodiment has been shown and described, it should be understood that many changes and modifications may be made therein without departing from the scope of the appended claims.

What is claimed is:

1. A method of manufacturing a sintered composite of a plurality of different materials, comprising the steps of:
   producing capsule-like powder composite particles composed of core particles and an electrically conductive covering material which covers and is adhered to said core particles, the core particles being substantially surrounded by the electrically conductive covering material, wherein said core particles have a melting point different from the melting point of said covering material;
   adding said capsule-like powder composite particles to a sintering mold; and
   applying pulsed voltages to said capsule-like powder composite particles in the sintering mold and bonding the capsule-like particles to one another to form a coherent mass, thereby producing a sintered composite.

2. A method according to claim 1, wherein said covering material is in the form of powder particles which have a diameter smaller than the diameter of said core particles.

3. A method according to claim 1, wherein said core particles have a melting point lower than the melting point of said covering material.

4. A method according to claim 1, wherein said core particles are of an electrically nonconductive material.

5. A method according to claim 1, wherein said core particles are of a rubber material.

6. A method according to claim 1, wherein said core particles are of a synthetic resin material.

7. A sintered composite comprising a solid mass of capsule-like powder composite particles composed of core particles and an electrically conductive covering material which covers and is adhered to said core particles, the core particles being substantially surrounded by the electrically conductive covering material; said electrically conductive covering material having a melting point higher than the melting point of said core particles, said capsule-like particles being bonded to one another to form said solid mass.

8. A sintered composite according to claim 7, wherein said covering material is in the form of powder particles which have a diameter smaller than the diameter of said core particles.

9. A sintered composite according to claim 7, wherein said core particles are of a metal which has a melting point lower than the melting point of said covering material.

10. A sintered composite according to claim 7, wherein said core particles are of an electrically nonconductive material.

11. A sintered composite according to claim 7, wherein said core particles are of a nonmetal material.

12. A sintered composite according to claim 7, wherein said core particles are of a rubber material.

13. A sintered composite according to claim 7, wherein said core particles are of a synthetic resin material.

* * * * *